United States Patent
Brandscheid et al.

(10) Patent No.: US 9,284,767 B2
(45) Date of Patent: Mar. 15, 2016

(54) SIDE SPOILER ARRANGEMENT FOR A MOTOR VEHICLE

(71) Applicant: GM GLOBAL TECHNOLOGY OPERATIONS LLC, Detroit, MI (US)

(72) Inventors: Klaus Brandscheid, Geisenheim (DE); Ute Schaaf, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/303,308

(22) Filed: Jun. 12, 2014

(65) Prior Publication Data

US 2014/0367992 A1     Dec. 18, 2014

(30) Foreign Application Priority Data

Jun. 13, 2013 (DE) ...................... 20 2013 005 386 U

(51) Int. Cl.
*E05F 15/41* (2015.01)
*E05F 15/42* (2015.01)
*B62D 35/00* (2006.01)
*B62D 37/02* (2006.01)

(52) U.S. Cl.
CPC ................ *E05F 15/41* (2015.01); *B62D 35/00* (2013.01); *B62D 35/008* (2013.01); *E05F 15/42* (2015.01); *B62D 37/02* (2013.01)

(58) Field of Classification Search
CPC ............. B60J 5/10; B60J 5/101; E05F 15/40; E05F 15/41; E05F 15/42; E05F 15/47; B62D 25/02; B62D 25/04; B62D 35/008; B62D 35/007; B62D 37/02

USPC ......... 296/50, 56, 146.2, 146.4, 146.5, 146.8, 296/146.9, 152, 180.1, 180.2
See application file for complete search history.

(56) References Cited

U.S. PATENT DOCUMENTS

| | | | |
|---|---|---|---|
| 7,055,885 B2 * | 6/2006 | Ishihara et al. | 296/146.4 |
| 8,123,277 B2 * | 2/2012 | Aldersley et al. | 296/146.9 |
| 8,635,809 B2 | 1/2014 | Wuerstlein et al. | |
| 2009/0136716 A1 * | 5/2009 | Scherraus et al. | 428/156 |
| 2013/0020822 A1 * | 1/2013 | Inoue | B62D 35/007 296/1.08 |

FOREIGN PATENT DOCUMENTS

| | | |
|---|---|---|
| DE | 102004056153 A1 | 6/2006 |
| DE | 202007004037 U1 | 7/2008 |
| DE | 102007050352 A1 | 4/2009 |
| DE | 102008011179 A1 | 8/2009 |
| DE | 102008020086 A1 * | 10/2009 |
| DE | 102009011063 A1 | 9/2010 |

OTHER PUBLICATIONS

German to English translation of De 10 2008 020 086, retereived from Espacenet via PatentTranslate on May 6, 2015.*

* cited by examiner

*Primary Examiner* — Jason S Daniels
(74) *Attorney, Agent, or Firm* — Ingrassia Fisher & Lorenz PC

(57) ABSTRACT

A side spoiler arrangement for a motor-driven tailgate of a motor vehicle is provided. The side spoiler arrangement case includes at least one spoiler element arranged along a lateral edge of a rear window. The spoiler element provides a function for improving the aerodynamics of the motor vehicle. An obstruction sensor device is fastened to the spoiler element and coupled to a drive of the tailgate.

15 Claims, 2 Drawing Sheets

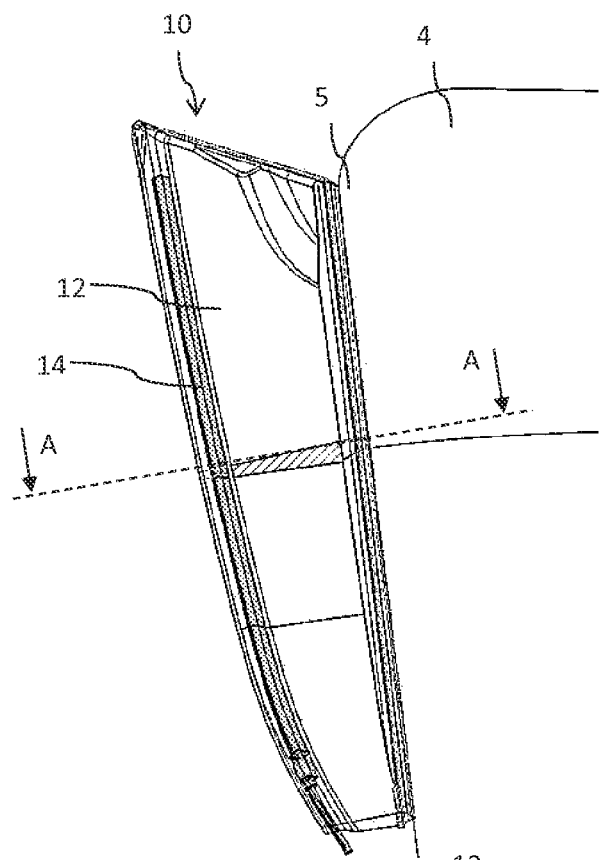
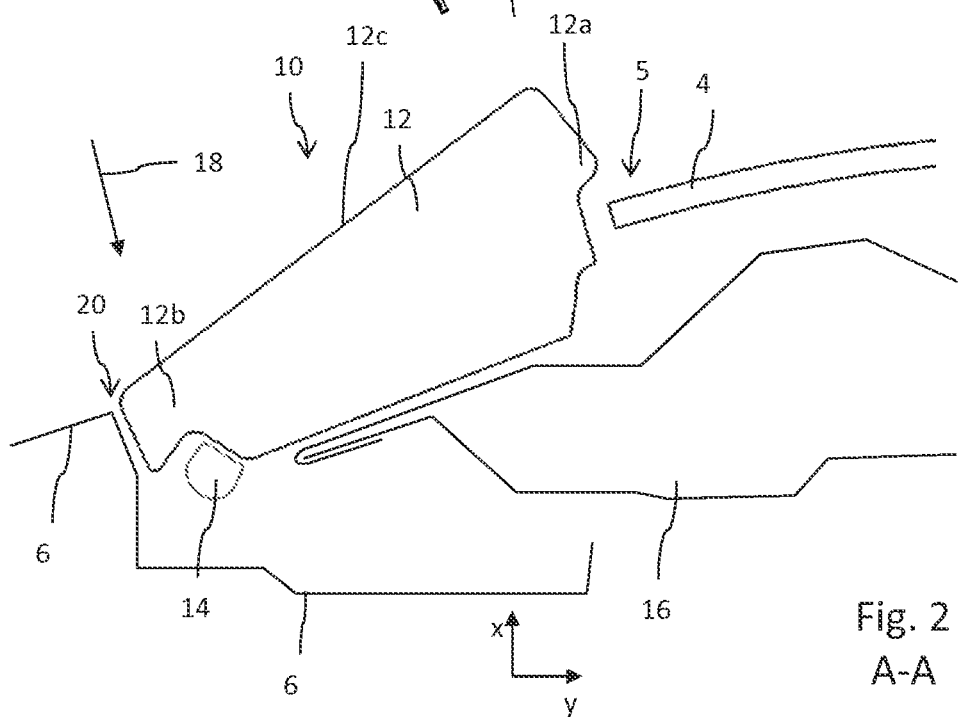
Fig. 1
Fig. 2
A-A

SIDE SPOILER ARRANGEMENT FOR A MOTOR VEHICLE

CROSS REFERENCE TO RELATED APPLICATION

This application claims priority to German Patent Application No. 202013005386.0 filed Jun. 13, 2013, which is incorporated herein by reference in its entirety.

TECHNICAL FIELD

The technical field relates to a side spoiler arrangement for a motor vehicle and in particular a side spoiler arrangement for a for example electric motor-operated tailgate of a motor vehicle.

BACKGROUND

For minimizing the fuel consumption of motor vehicles, aerodynamically favorable design of the outer vehicle body proves to be particularly favorable. At the motor vehicle rear end it proves to be advantageous when the transition from a motor vehicle side wall towards a rear window is configured aerodynamically. Comparatively small curvature radii or abruptly changing outer contours of the motor vehicle body can improve the vehicle aerodynamics. For example, the transition from a side wall to a rear window in the region above the belt line of the motor vehicle, cause so-called aerodynamic stall which can lead to an undesired increase of the air resistance of the motor vehicle body.

To improve the aerodynamic characteristics of motor vehicles, side spoilers are therefore known which can be arranged on a vehicle side door or on the window frame of a rear window, approximately between belt line and upper window frame of the rear window. Such a side spoiler is known for example from DE 10 2009 011 063 A1.

Such side spoilers are fastened separately to a window frame of a tailgate or to a side wall. The side spoiler in this case exclusively has a function which improves the aerodynamics of the motor vehicle.

SUMMARY

In accordance with the present disclosure the function of such side spoilers, in particular in the case of motor vehicles with driven or automatic tailgate is provided. The side spoiler arrangement as disclosed herein also contributes to a reduction of the motor vehicle gross weight and provides a simplified assembly for further motor vehicle components to be arranged on the tailgate. In addition, the side spoiler arrangement contributes to the reduction of assembly effort and for reducing production costs.

In an embodiment disclosed herein, a side spoiler arrangement for a driven tailgate of a motor vehicle is provided. The side spoiler arrangement in this case includes at least one spoiler element that can be arranged along a lateral edge of a rear window. On that spoiler element, which provides a function for improving the aerodynamics of the motor vehicle, an obstruction sensor device is fastened and can be coupled to a drive of the tailgate.

Through such an arrangement of an obstruction sensor device on the spoiler element, separate fastening of such an obstruction sensor device to the tailgate can be omitted. In this regard, the side spoiler arrangement provided here constitutes an integration of spoiler element and obstruction sensor device. Thus, through the mere arranging and fastening of the spoiler element to the tailgate the obstruction sensor device can also be fastened to the tailgate side. A separate assembly of an obstruction sensor device on the tailgate can be omitted in this regard.

In addition, no separate fastening means for fixing the obstruction sensor device on the tailgate need be provided because of the arrangement of the obstruction sensor device on the spoiler element. A corresponding fastening component, for example in the form of a support rail, can be advantageously omitted. Thus, the number of components and the gross weight of the tailgate and hence the gross weight of the motor vehicle can be advantageously reduced or minimized.

According to a further configuration, the obstruction sensor device is integrated in the spoiler element. The spoiler element can for example include a receptacle for the obstruction sensor device, into which that obstruction sensor device can be inserted. However, it can also be provided that the obstruction sensor device is fastened to the spoiler element in a fixed and non-detachable manner but protrudes or projects from the outer contour of the spoiler element at least in sections or regions. Through the integration of the obstruction sensor device in the spoiler element, a separate assembly of the obstruction sensor device on the tailgate is omitted. The motor vehicle final assembly can be simplified and rendered more efficient because of this.

According to a further configuration, the obstruction sensor device can be fastened to the tailgate via the spoiler element. An arrangement and fastening of the obstruction sensor device on the tailgate is effected via a two-fold or gradual fastening. Thus, the obstruction sensor device is fastened to the spoiler element and the spoiler element itself is fastened to the tailgate. Because of this it can be achieved that the obstruction sensor device comes to lie spaced from the support structure of the tailgate, wherein that spacing can be bridged via the spoiler element.

However, it is also conceivable that the obstruction sensor device despite exclusive assembly via the spoiler element comes in direct contact position with the tailgate or with the tailgate support structure. By way of the spoiler element which is typically produced from plastic and can be variably adapted with respect to its shaping to different motor vehicle geometries or body geometries the position and orientation of the obstruction sensor device with respect to the tailgate support structure can also be variably modified without modifications on the support structure of the tailgate being necessary for this purpose.

The spoiler element can in particular be designed as a plastic molded part or as a plastic injection molded part, which can be modified with respect to its geometrical configuration and contour by selecting suitable molds or injection molding tools with relative ease. By way of a spoiler element which is individually and motor vehicle type specifically configured, the obstruction sensor device can thus provide a motor vehicle type specific and variable arrangement which is adapted to the respective installation situation and obstruction configuration and orientation with respect to a tailgate support structure with respect to a lateral frame enclosing the window.

According to a further configuration, the spoiler element includes a first section portion for arrangement on the lateral edge of the rear window. The spoiler element can in particular be designed as a spoiler section which upon final assembly on the tailgate adjoins the rear window either directly with its first section portion or comes to lie facing the lateral edge of the rear window with its first section portion. Typically, the first section portion extends along the entire lateral edge of the rear window, for example from an upper window edge to a lower window edge. In this configuration, the first section is typically positioned approximately at the height of the belt line of the motor vehicle body. By means of the first section portion, the spoiler element can provide a particularly favorable transition towards the rear window in terms of air flow.

According to a further configuration, the spoiler element includes a second section portion for receiving the obstruction sensor device. That second section portion is typically formed spaced from the first section portion. The second section portion can in particular be designed for receiving the obstruction sensor device. For example, the second section portion can include a shoulder which is matched to the outer contour of the obstruction sensor device, an undercut or a corresponding recess, the depth or height of which approximately corresponds to the cross-sectional geometry of the obstruction sensor device. By configuring the second section portion to receive the obstruction sensor device, the obstruction sensor device can be arranged on the tailgate in a particularly space-saving manner.

According to a further configuration, the second section portion is formed on a cross-sectional region of the spoiler element which is located opposite the first section portion of the spoiler element. While the first section portion, typically seen in vehicle transverse direction (y) faces the vehicle interior, the second section portion is located typically adjoining the side wall or a C or D-pillar of the motor vehicle body; consequently based on the vehicle transverse direction (y) in an outwardly directed region of the spoiler element. Furthermore, through the opposite arrangement of first and second section portion, fastening of the obstruction sensor device to the tailgate spaced from the support structure of the tailgate can be affected.

According to a further configuration, the obstruction sensor device is an elongated element which extends along the second section portion of the spoiler element. Typically, the obstruction sensor device which may be formed strip-like has a contour that extends almost over the entire length of the spoiler element. Thus, the obstruction sensor device can be formed as an obstruction sensor strip, which extends, comparable to the spoiler element, from a belt line, i.e. from the lower edge of the rear window, up to an upper edge of the rear window along the rear window lateral edge. By means of an obstruction sensor device which continuously extends along the second section portion, reliable detection of an obstruction situation in any location in the lateral edge region of the rear window can be detected.

According to a further configuration, the obstruction sensor device is designed as a pressure sensor. Here it is provided in particular that the obstruction sensor device is designed for the measurable generation or changing of an electrical signal as a result of pressure loading thereon. Furthermore, the obstruction sensor device in this case can be coupled via connected cables to the drive of the tailgate, in particular to a control device controlling the motor-drive of the tailgate. If the obstruction sensor device detects the event of an obstruction as a result of pressure loading during the closing of the tailgate, it is designed to transmit a control signal which can be evaluated or processed by the control unit for stopping or reversing the tailgate drive.

The obstruction sensor device may include a flexible or deformable elongated strip with a cylindrical or hose-like or lip-like appearance. It is envisioned that a pressure-sensitive layer, for example in the form of a piezo varnish, is formed on the elongated strip. It is furthermore envisioned that the obstruction sensor device includes at least one or multiple electrically conductive layers or structures, which upon pressure loading come into contact position with one another, thus measurably changing the electrical resistance of the obstruction sensor device. It is furthermore envisioned that the obstruction sensor device acts as a type of pressure-sensitive switch.

According to a further configuration, the obstruction sensor device is additionally connected to the spoiler element in a materially joined manner. Typically, the obstruction sensor device includes a polymer or elastomer material, which can be connected to the plastic spoiler element in a materially-joined manner. Here it is conceivable to non-detachably fasten the obstruction sensor device to the spoiler element. For example, the obstruction sensor device can be glued or vulcanized onto the spoiler element. Furthermore, thermal joining methods for fastening the obstruction sensor device to the spoiler element are conceivable. It can also be provided, for example, that the obstruction sensor device is unitarily formed with the spoiler element. The materially-joined connection of spoiler element and obstruction sensor device is particularly advantageous with respect to assembly since because of this a particularly space-saving and installation space-optimized fastening of the obstruction sensor device of the tailgate can be provided.

The spoiler element, itself, can also be fastened according to a further configuration in a materially-joined manner to a window frame, thus to the support structure of the tailgate. Alternatively it is also envisioned to fasten the spoiler element to the window frame of the tailgate in a positively mechanically-joined manner, for example by means of clips, screws, threaded fasteners or similar fastening means. In particular a clipped-on fastening of the spoiler element on the tailgate can prove to be particularly favorable in terms of assembly since no assembly tools whatsoever are required for this.

According to a further aspect, a motor vehicle body with a tailgate that can be actuated by means of a drive is finally provided. On the tailgate, at least one previously described side spoiler arrangement with an obstruction sensor device is arranged. The drive can be configured in particular as an electric, pneumatic or hydraulic drive, which is typically at least electrically activatable. In the final assembly state on the tailgate the obstruction sensor device of the side spoiler arrangement is coupled to the drive. Coupling in this case is typically effected via cables and a control device controlling the drive. Upon detection of an obstruction situation by means of the obstruction sensor device, the control device can instantaneously interrupt and halt a currently occurring closing movement of the tailgate and subsequently initiate a reversing operation, i.e. an opening movement of the tailgate.

By providing the obstruction sensor device on the side spoiler element, a separate arrangement and fastening of an obstruction sensor device to the tailgate, in particular on the window frame of the tailgate can be advantageously omitted.

According to a further configuration, the spoiler element is arranged on a window frame of the tailgate in such a manner that the obstruction sensor device which is fastened to the spoiler element is located in front of the window frame relative to a closing movement of the tailgate. Seen in the direction of the closing movement of the tailgate, the obstruction sensor device is arranged leading the tailgate in a manner of speaking, so that in the case of an obstruction situation the obstruction sensor device as first component of the tailgate comes into contact position with an obstructing object.

According to a further configuration, the side spoiler arrangement in closing position of the tailgate forms a gap to a laterally adjoining side wall of the body. Here, the side wall can include an outer panel, which is arranged surface-flush with the outside or the outer contour of the spoiler element. In this way, an aerodynamically favorable design of the body outer skin or of the outer contour of the motor vehicle body can be created.

According to a further aspect, a motor vehicle is finally provided, which includes a previously described motor vehicle body or at least a previously described side spoiler arrangement.

BRIEF DESCRIPTION OF THE DRAWINGS

The present disclosure will hereinafter be described in conjunction with the following drawing figures, wherein like numerals denote like elements, and:

FIG. 1 shows a detail perspective representation of a side spoiler arrangement,

FIG. 2 shows a cross-section A-A through the side spoiler arrangement according to FIG. 1

DETAILED DESCRIPTION

Figure 3:
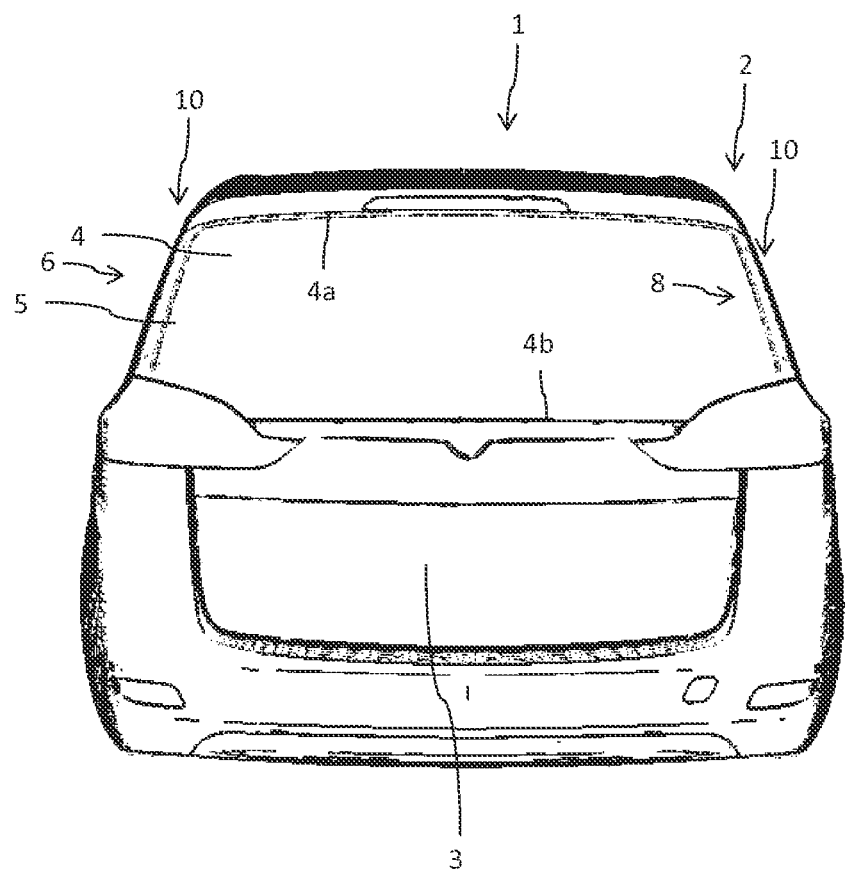
FIG. 3 shows an exemplary rear view of a motor vehicle equipped with a tailgate.

The following detailed description is merely exemplary in nature and is not intended to limit the present disclosure or the application and uses of the present disclosure. Furthermore, there is no intention to be bound by any theory presented in the preceding background or the following detailed description.

The motor vehicle 1 shown from the rear in FIG. 3 includes a self-supporting motor vehicle body 2 with a driven tailgate 3. Here, the tailgate 3 is provided with a rear window 4 enclosed in a window frame 16 as best seen in FIG. 2. In FIG. 3 a drive 8 for the tailgate 3 is additionally indicated, by means of which the tailgate can be transferred automatically from a closing position shown in FIG. 3 into an opening position which is not shown here and vice versa from an opening position into a closing position. The drive 8 in this case can be activated at least electrically. On the lateral edges of the rear window 4, in particular between an upper window edge 4a and a lower window edge 4b running approximately at the height of the belt line of the motor vehicle, a side spoiler arrangement 10 each is arranged on the lateral edges 5 of the rear window 4.

The side spoiler arrangement 10, as is shown in perspective representation in FIG. 1, includes a flat spoiler element 12 adjoining a side wall 6 of the motor vehicle body 2 with its outside in an approximately surface-flush manner. The spoiler element 12 and thus the entire side spoiler arrangement 10 in this case extend along the entire lateral edge 5 of the rear window 4. Furthermore, the spoiler element 12 in this case is arranged on the window frame 16 which is shown in FIG. 2 in a cross-sectioned manner and is typically fastened thereon non-detachably.

The spoiler element 12 can for example be fastened to the window frame 16 in a positively-joined or materially-joined manner. It is conceivable to clip the spoiler element 12 to the window frame 16, so that a first section portion 12a shown in FIG. 2 on the right encloses the lateral edge 5 of the rear window 4 or at least adjoins thereon in the predetermined manner. Starting out from the side wall 6 towards the rear window 4, the spoiler element 12 has a cross-sectional geometry for example increasing wedge-like. The outer contour 12c of the spoiler element 12 forms an offset at the transition to the first section portion 12a which is brought about in that the spoiler element 12 protrudes to the outside from a direct and imaginary connection line between the outside of the side wall 6 and the rear window 4. That wedge-like and outwardly projecting construction of the spoiler element 12 can counteract an unfavorable aerodynamic stall in the transition region from the side wall 6 to the tailgate 3 or to the rear window 4 in an aerodynamically favorable manner.

Located opposite the first section portion 12a, the spoiler element 12 includes a second section portion 12b. That section portion 12b constitutes an L-shaped recess or depression in that cross sectional region of the spoiler element 12, which in closing position of the tailgate 3 comes to lie facing the side wall 6. In or on that second section portion 12b, an elongated obstruction sensor device 14 in a cylindrical, hose-like, lip-like or strip-like configuration is arranged. The latter is connected to a control device via cables, both of which are not shown separately from the drive 8. The control device is coupled to the drive 8 of the tailgate 3.

The obstruction sensor device 14 which may be arranged on the spoiler element 12 or integrated in the spoiler element 12 is configured in particular as a pressure sensor and can upon pressure loading in the event of an obstruction either transmit a control signal to the control device via suitable cables so that the control device can halt a closing operation of the tailgate 3 which happens to take place at that time, and additionally reversing the tailgate 3 if appropriate by a predetermined dimension. The obstruction sensor device 14 can extend in particular along the entire longitudinal extension of the spoiler element 12. It can furthermore be arranged on the spoiler element 12 in a materially-joined manner. For example, the obstruction sensor device 14 may be glued or vulcanized onto the plastic spoiler element 12.

Based on a closing movement 18 of the tailgate, the obstruction sensor device 14 is located in front of the window frame 16 in such a manner that the obstruction sensor device 14 in the presence of an obstacle in the closing region of the tailgate 3 comes into contact with the obstacle as the first component of the tailgate 3. In this regard, the obstruction sensor device 14 is arranged on a second section portion 12b of the spoiler element 12 facing the interior space of the motor vehicle or the adjoining side wall 6 which is shown in FIG. 2. When the tailgate 3 is in a closing position shown in FIG. 2, the side spoiler arrangement 10, and in particular its spoiler element 12, forms a predetermined gap 20 to the adjoining side wall 6.

Through the exclusive arrangement of the obstruction sensor device 14 on the spoiler element 12, a separate arrangement and fastening of the obstruction sensor device 14 on a support structure of the tailgate 3 or on the window frame 16 of the tailgate 3 can be advantageously omitted. Corresponding assembly means and assembly resources can therefore be omitted in a cost, material and weight-saving manner.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A side spoiler arrangement for a driven tailgate of a motor vehicle having a rear window with a window frame, the side spoiler arrangement comprising:

an integrally formed spoiler element configured to be arranged along a lateral edge of the rear window, and the spoiler element is non-detachably fixed to the window frame, the spoiler element having a first section portion and a second section portion, with an outer contour defined between the first section portion and the second section portion, the second section portion spaced apart from a side wall of a body of the motor vehicle and forming a recess below the outer contour of the spoiler element; and at least one obstruction sensor device configured to be coupled to a drive of the tailgate and fastened to the spoiler element within the recess.

2. The side spoiler arrangement according to claim 1, wherein the obstruction sensor device is integrated in the spoiler element.

3. The side spoiler arrangement according to claim 1, wherein the obstruction sensor device is configured to be fastened to a tailgate via the spoiler element.

4. The side spoiler arrangement according to claim 1, wherein the spoiler element comprises the first section portion configured to be arranged on the lateral edge of the rear window.

5. The side spoiler arrangement according to claim 1, wherein the obstruction sensor device extends along an edge of the second section portion in an elongated manner.

6. The side spoiler arrangement according to claim 1, wherein the second section portion is formed on a cross-sectional region of the spoiler element which is located opposite the first section portion.

7. The side spoiler arrangement according to claim 1, wherein the obstruction sensor device comprises a pressure sensor indicating a pressure loading therefor.

8. The side spoiler arrangement according to claim 1, wherein the obstruction sensor device is connected to the spoiler element in a materially joined manner.

9. The side spoiler arrangement according to claim 1, wherein the spoiler element is fastened to the window frame in a positively joined manner.

10. The side spoiler arrangement according to claim 1, wherein the spoiler element is fastened to the window frame in a materially joined manner.

11. A motor vehicle body comprising:

a tailgate actuatable by means of a drive, the tailgate having a rear window, the rear window including a window frame;

an integrally formed spoiler element positioned along a lateral edge of the rear window and non-detachably fixed to the window frame, the spoiler element having a first section portion and a second section portion, with an outer contour defined between the first section portion and the second section portion, the second section portion spaced apart from a side wall of the motor vehicle body and forming a recess below the outer contour of the spoiler element; and at least one obstruction sensor device coupled to the drive and fastened to the spoiler element within the recess.

12. The motor vehicle body according to claim 11, wherein the spoiler element forms a gap with a laterally adjoining side wall of the motor vehicle body in a closing position of the tailgate.

13. The motor vehicle body according to claim 11, wherein the spoiler element is arranged on the window frame in such a manner that the obstruction sensor device is positioned in front of the window frame based on a closing movement of the tailgate.

14. The motor vehicle body according to claim 13, wherein the spoiler element forms a gap with a laterally adjoining side wall of the motor vehicle body in a closing position of the tailgate and the second section portion of the spoiler element extends beyond an edge of the window frame.

15. The motor vehicle body according to claim 11, wherein the spoiler element has an increasing wedge-shaped cross section.

* * * * *